Figure 1A:
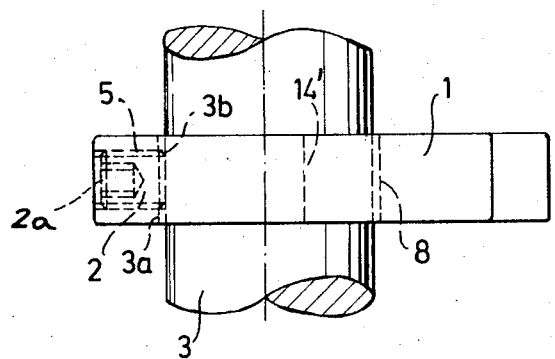

United States Patent [19]
Feinler

[11] 3,730,569
[45] May 1, 1973

[54] ADJUSTABLE MOUNTING FOR SHAFT-SUPPORTED ELEMENTS

[75] Inventor: Raimund Feinler, Spaichingen, Germany

[73] Assignee: Firma Maschinen-Konstruktions-Gesellschaft mit beschrankter Haftung, Spaichingen, Germany

[22] Filed: Sept. 2, 1971

[21] Appl. No.: 177,324

[30] Foreign Application Priority Data

Sept. 7, 1970   Germany....................P 20 44 238.0

[52] U.S. Cl. .............................................287/52.08
[51] Int. Cl. .................................................F16d 1/06
[58] Field of Search..........................287/52.08, 52.07

[56] References Cited

UNITED STATES PATENTS

| | | | |
|---|---|---|---|
| 780,850 | 1/1905 | Williams | 287/52.08 |
| 394,729 | 12/1888 | Shartle | 287/52.08 |
| 3,323,817 | 6/1967 | Hollyday | 287/52.08 |
| 362,167 | 5/1887 | Macklin | 287/52 R |
| 1,292,242 | 1/1919 | Brophy | 287/52.08 |
| 871,677 | 11/1907 | Dawes et al. | 287/52.08 |
| 1,255,952 | 2/1918 | Thorpe | 287/52.08 |

*Primary Examiner*—Andrew V. Kundrat
*Attorney*—Karl F. Ross

[57] ABSTRACT

A torque-transmitting element, such as a chuck, cam or abutment, to be adjustably mounted on a rotating or fixed shaft has an axial bore of the same diameter as the shaft but with a sectoral zone of larger radius extending over an arc between 90° and 150°. Opposite that zone, a radial bore threaded to receive a setscrew lies in the plane bisecting the arc whereby a tightening of the setscrew wedges the shaft between two arcuate bore portions flanking the sectoral zone.

2 Claims, 6 Drawing Figures

ADJUSTABLE MOUNTING FOR SHAFT-SUPPORTED ELEMENTS

My present invention relates to an adjustable mounting for a torque-transmitting element, such as a chuck, cam, gear, abutment or the like, which is to be firmly supported on a rotatable or fixed shaft.

Such torque-transmitting elements are used, for example, in machine tools of the chip-removing type, e.g., in the programming unit of an automatic lathe. Thus, a cam carried on a control shaft synchronized with the leadscrew of such a lathe may control its cross-slide to impart an exactly reproducible curvature to a series of workpieces; for precise setting, the position of the cam should be angularly adjustable. The same adjustability, sometimes also in axial direction, is required of sector gears intermittently meshing with a gear on an adjoining shaft, or of fixed abutments designed to intercept a rotating lug or the like in a predetermined position. In each of these instances, the element mounted on the shaft experiences repeated impacts which require a secure fastening to prevent any involuntary displacement.

The general object of my present invention, therefore, is to provide a simple and compact mounting for dependably securing such an element in its selected position on the supporting shaft.

A more specific object is to provide a mounting of this description which effectively immobilizes the supported element on its shaft by the tightening of a single setscrew or, at most, a small number of such setscrews positioned side by side.

These objects are realized, pursuant to my present invention, by providing a supported element with an axial bore which has the same diameter as the shaft except for a sectoral zone (or, possibly, a symmetrical pair of such zones) extending over an arc between 90° and 150°, the radius of this zone exceeding that of the shaft so as to provide a clearance into which the shaft body may yield under pressure of a set screw bearing generally radially upon the opposite shaft surface substantially in the plane bisecting the arc of the clearance. Owing to this pressure, the shaft is forced into the nip of a pair of arcuate bore portions flanking the recessed zone, the resulting wedging effect holding the shaft firmly against both rotary and axial displacement relative to the surrounding element.

Figure 1B:
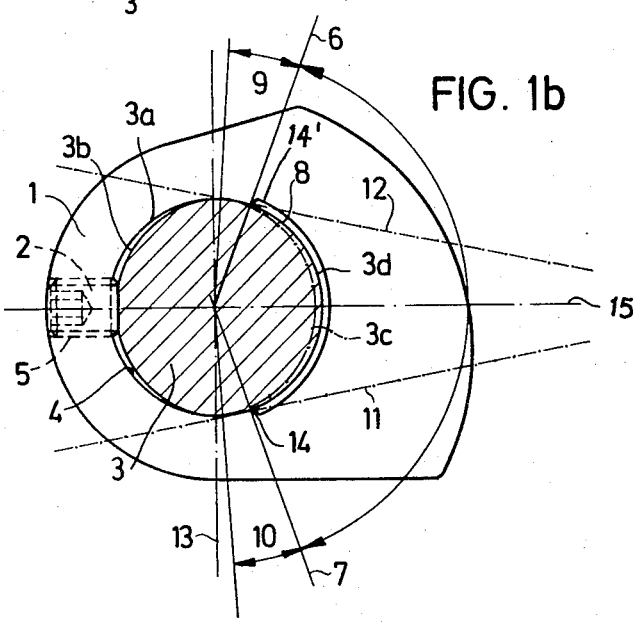
Figure 2A:
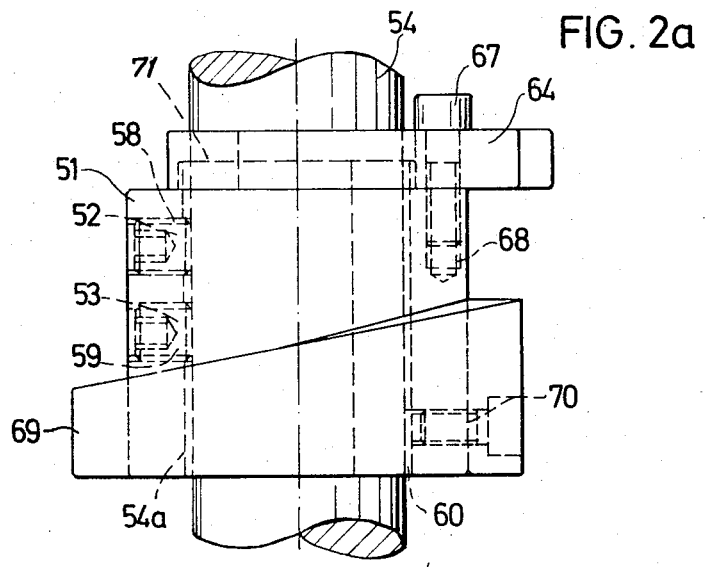
Figure 2B:
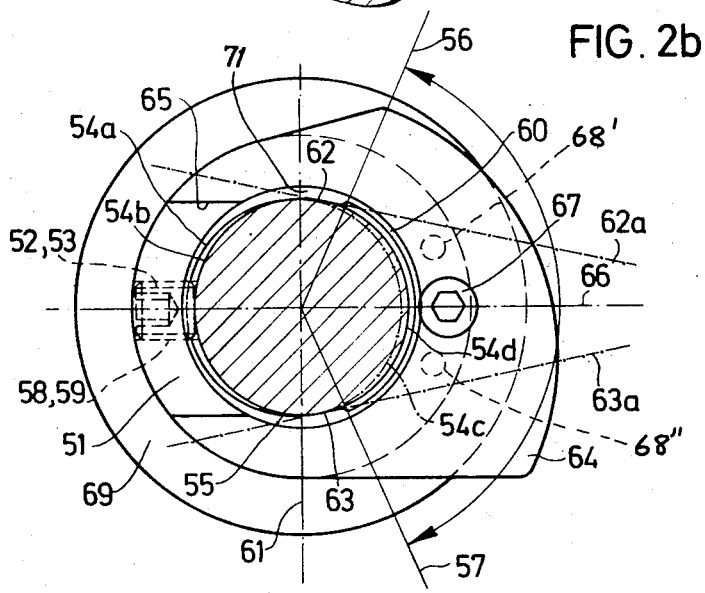
Figure 3A:
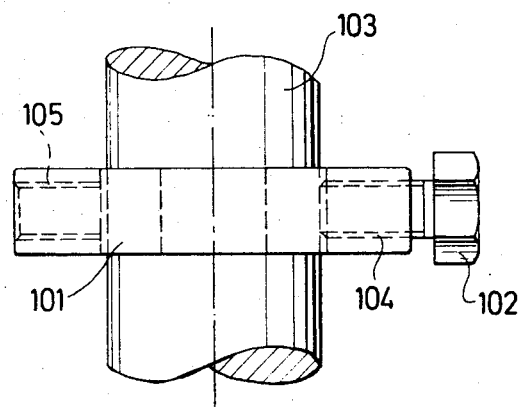
Figure 3B:
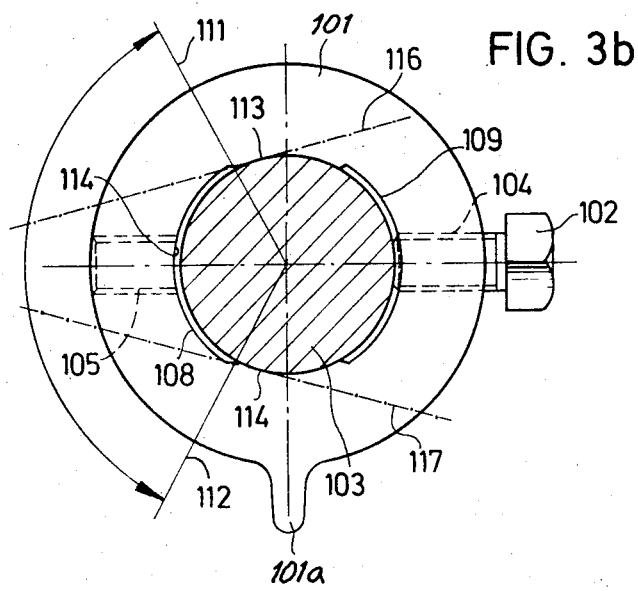

The invention will be described in detail hereinafter with reference to the accompanying drawing in which:

FIGS. 1a and 1b are side view and an axial plan view, respectively, of a mounting embodying the invention;

FIGS. 2a and 2b are views similar to FIGS. 1a and 1b, illustrating another embodiment; and FIGS. 3a and 3b are further similar views, showing still another modification.

The assembly shown in FIGS. 1a and 1b comprises a horizontal or vertical shaft 3 of circular cross-section supporting a torque-transmitting element 1 here shown as a cam disk. Shaft 3 traverses an axial bore 4 of disk 1 whose cross-section deviates from that of the shaft by being radially enlarged to form a pheripheral clearance 8 extending over an arc within the aforementioned range of 90° to 150°; the enlarged sector, bounded by shoulders 14' and 14 on radii 6 and 7, symmetrical about an axial plane 15 bisecting its arc. Along that plane 15, disk 1 is provided with a threaded bore 5 opposite clearance 8, this bore accommodating a setscrew 2 with a polygonal recess 2a for a fastening tool such as an Allen wrench. The depth of clearance 8 is not critical.

Since the radius of bore 4 is the same everywhere except along clearance 8, shaft 3 occupies therein a position indicated by a dot-dash outline 3c as long as the screw 2 is not tightened. Upon such tightening, the shaft body is displaced to the right (with reference to disk 1) so that its left-hand surface 3b separates from the corresponding bore surface 3a whereas its right-hand surface approaches the periphery of clearance 8 as indicated in full lines at 3d. This displacement, somewhat exaggerated in the drawing for the sake of clarity, is facilitated by manufacturing tolerances and/or by a certain relative deformability of elements 1 and 3. Within a pair of narrow sectors 9 and 10, flanking the clearance 8, arcuate portions of bore 4 having the same radius as shaft 3 peripherally engage the latter and exert a wedging effect thereon; these arcuate portions extend from shoulders 14, 14' to almost the axial plane 13 perpendicular to bisector plane 15, the exaggerated divergence of the sector boundaries from plane 13 being due to the relative radial shift of the shaft and the disk. Phantom lines 11 and 12, tangent to these arcuate bore portions midway along their sectors, converge at an angle which ranges between about 15° and 45° according to the arc length of clearance 8. Shaft 3 is practically in full surface contact with disk 1 along sectors 9 and 10 so as to be effectively held against rotation as well as axial movement relative to the disk which is supported thereon at three points.

In FIGS. 2a and 2b I have shown a shaft 54 on which a cylindrical element 51 is mounted in essentially the same manner as described for the disk 1 of the preceding embodiment; this element serves as a carrier for a pair of supplemental members 64 and 69 secured thereto. Member 64 is a radial cam attached to cylinder 51 by an axially extending bolt 67 engaging in a threaded bore 68; this member has a slot 65 whose width equals the diameter of shaft 54 and whose edges at the slot mouth are parallel to an axial plane 66 bisecting the clearance 60 corresponding to clearance 8 of FIGS. 1a and 1b. A pair of radial bores 58, 59 in cylinder 51, whose axes coincide with plane 66, receive respective setscrews 52, 53 which bear upon the shaft so as to separate, in the aforedescribed manner, its left-hand surface 54b from the corresponding bore surface 54a while the opposite shaft surface shifts from a position 54c (dot-dash lines) to a position 54d (full lines) in clearance 60.

Cam member 64 is also formed with a central bore, of a radius somewhat exceeding that of shaft 54, which receives a hub 71 of body 51 with the same internal profile as the latter (including an extension of the sectoral groove 60) forming a seat for member 64.

The arcuate bore portions 62, 63, gripping the shaft under pressure of setscrews 52, 53, extend between a transverse plane 61 and radii 56 and 57 bounding the clearance 60; the tangents to the midpoints of these arcuate portions have been indicated at 62a and 63a.

The other supplemental member 69 is shown as an axially effective cam of annular shape embracing the cylinder 51 and secured thereto by a countersunk screw 70. Body 51 is provided with additional bores 68', 68" for alternately receiving the bolt 67 in different angular positions of disk 64, thereby enabling a relative adjustment of the two cam members 64 and 69; naturally, there could also be alternate bores for the screw 70 retaining the member 69.

In FIGS. 3a and 3b, finally, I have shown a symmetrical arrangement which differs from that of FIGS. 1a and 1b in that the bore 114 of the supported element 101 is formed with two symmetrical clearances 108, 109 confronting a pair of bores 104, 105 on diametrically opposite sides of shaft 103. The boundaries of clearance 108 have been indicated at 111, 112; the gripping portions 113, 114 on either side of that clearance, having tangents 116, 117, engage the shaft 103 under pressure of a setscrew 102 (here of the headed type) threaded into bore 104. The arrangement can obviously be reversed by inserting the screw 102 into the other radial bore 105. Element 101 is here shown as a disk carrying a lug or tooth 101a which may act as a stationary abutment or which may periodically engage a coacting gear not shown.

I claim:

1. In combination, a shaft of circular cross-section and a torque-transmitting element adjustably mounted on said shaft, said element being provided with an axial bore traversed by said shaft; said axial bore having a sectoral zone, extending over an arc between substantially 90° and 150°, whose radius exceeds that of said shaft and which is flanked by two arcuate bore portions of a radius corresponding to that of said shaft; said element being further provided with at least one generally radial threaded bore lying diametrically opposite said zone substantially in the plane bisecting said arc; a setscrew in said radial bore threadedly engaging same for exerting pressure upon said shaft, thereby wedging the latter between said arcuate bore portions; and a supplemental member detachably secured to an end face of said element and provided with a slot accommodating said shaft, said slot being provided with edges parallel to said bisecting plane.

2. The combination defined in claim 1, further comprising a second supplemental member secured to said element and axially spaced from the first-mentioned supplemental member with relative angular adjustability.

* * * * *